Patented Mar. 6, 1951

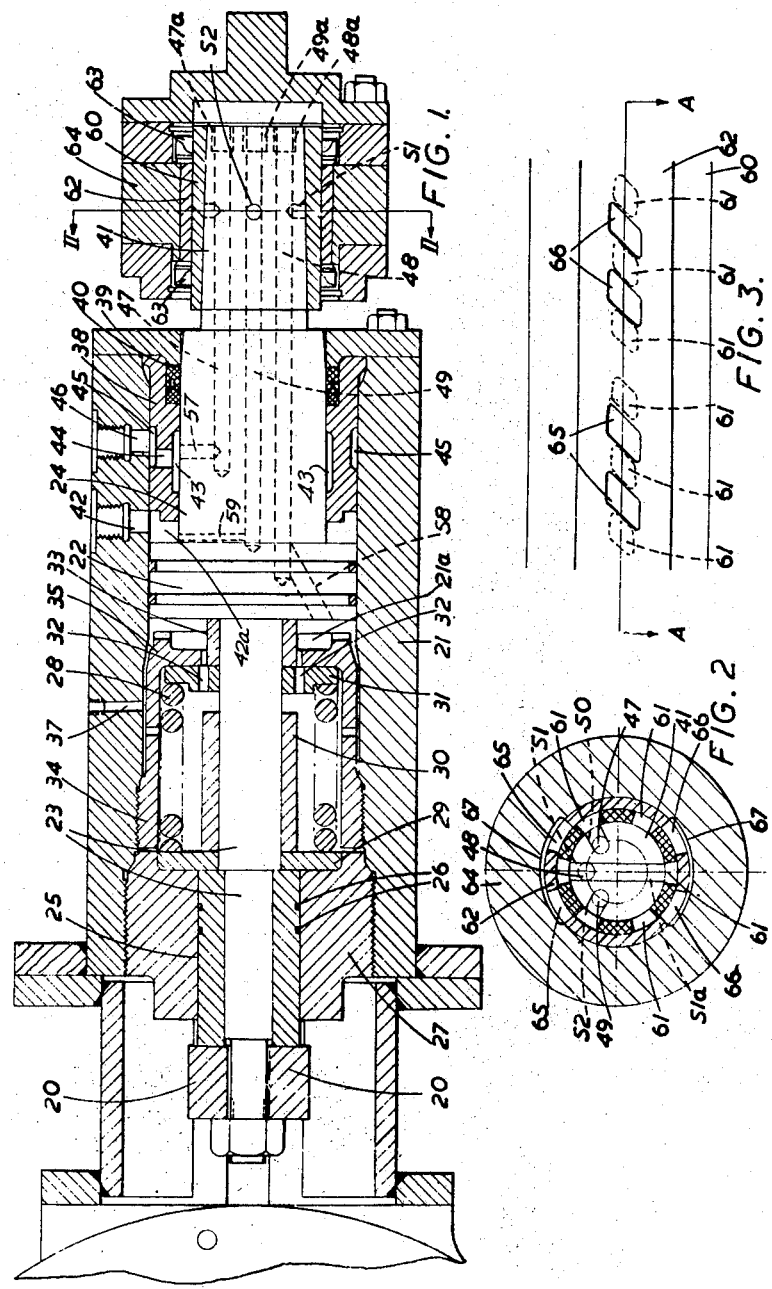

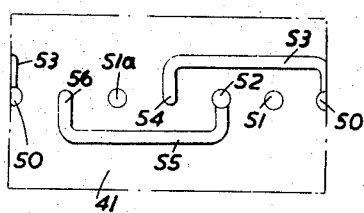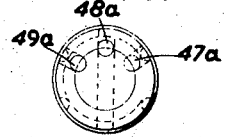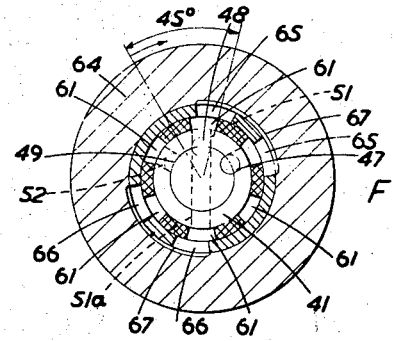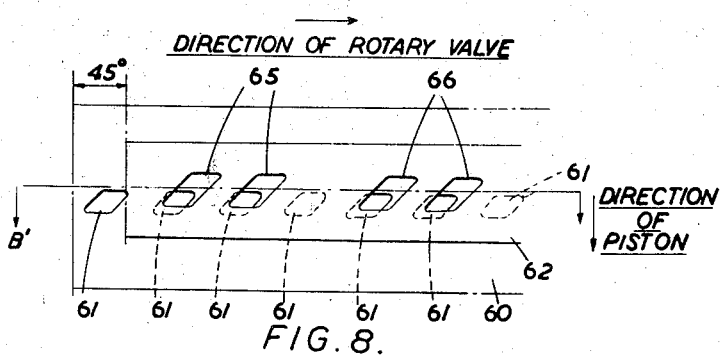

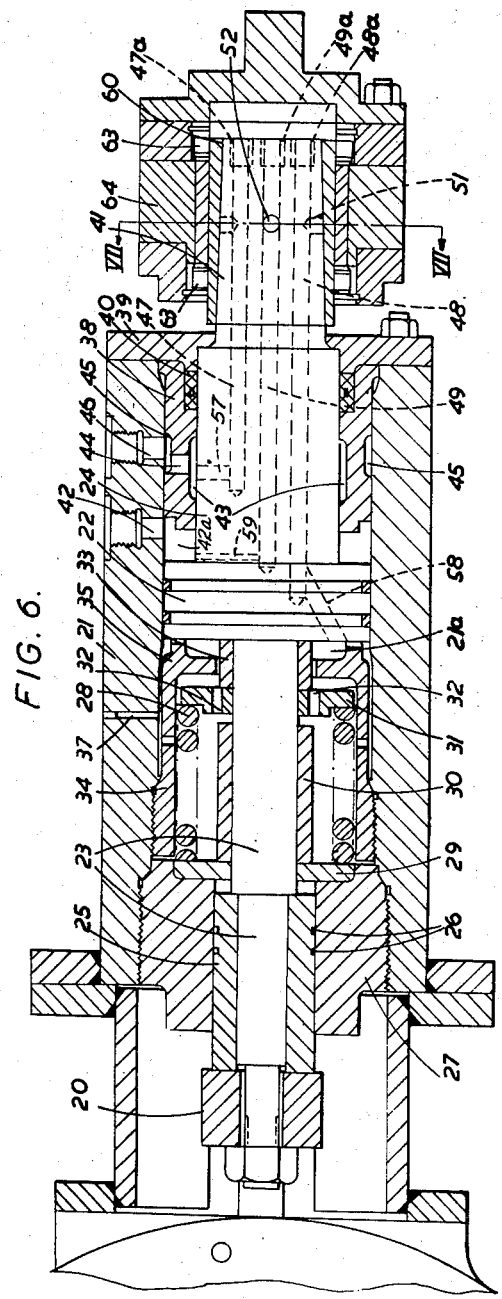

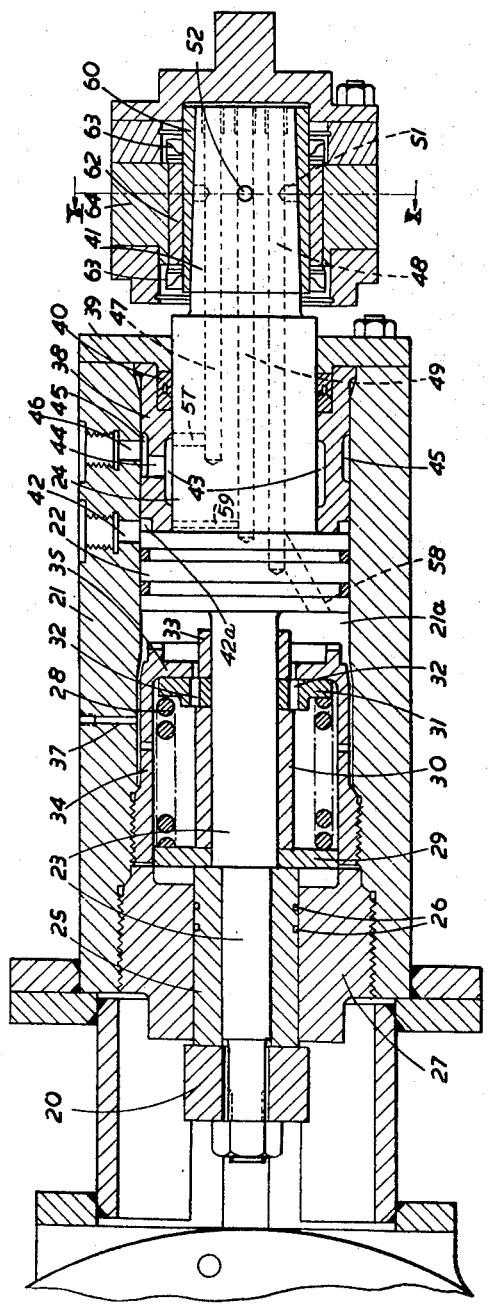

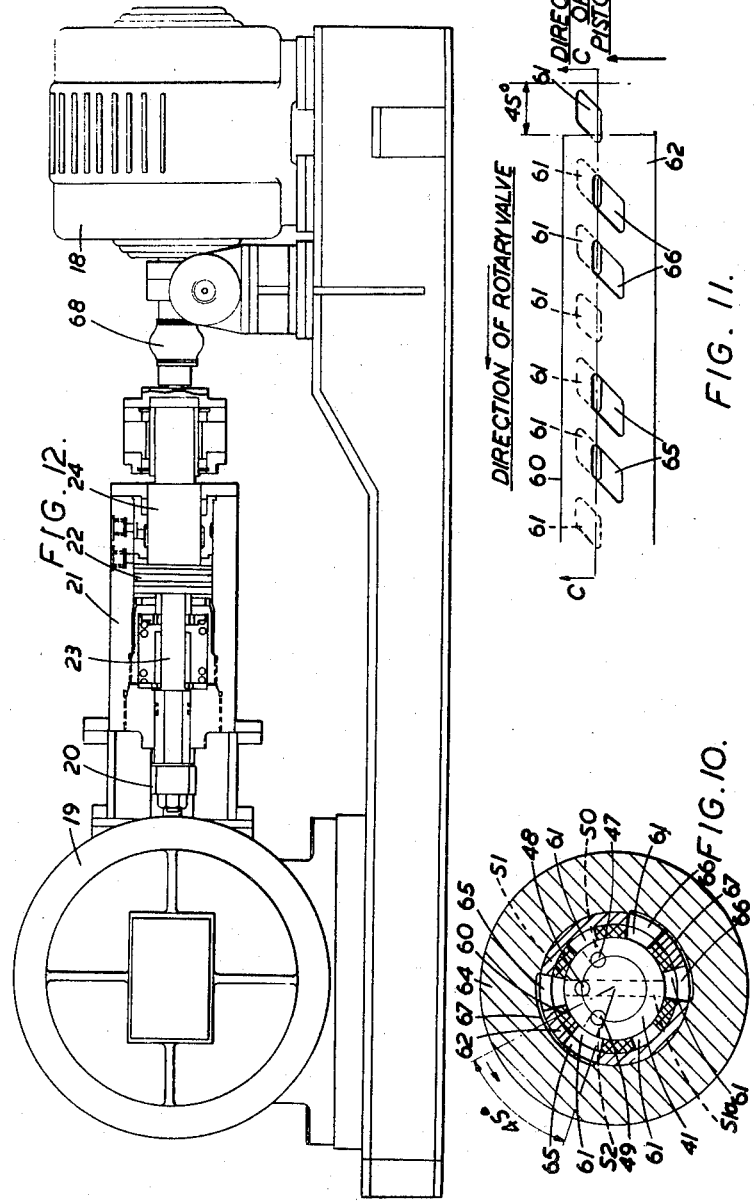

2,544,035

UNITED STATES PATENT OFFICE 2,544,035

HYDRAULIC SERVOMOTOR AND CONTROL VALVE THEREFOR

Alec Frank Marshall and Harry Andrew Rees, Sheffield, England, assignors to Davy And United Engineering Company Limited, Sheffield, England Application July 8, 1949, Serial No. 103,686
In Great Britain July 8, 1948

5 Claims. (Cl. 121—41)

1

This invention relates to hydraulic servo-motors and control valves therefor. It is an object of the invention to provide a hydraulic servo-motor having a rotary driven member and a reciprocatory follower the stroke of which is correlated with the arcuate movement of the driven member, the axial movement of the follower being employed in the control of the apparatus with which the servo-motor is associated. It is another object of the invention to provide for such a servo-motor a valve the design of which enables the relation of the axial stroke with the arcuate movement to be varied.

According to the present invention a hydraulic servo-motor comprises a piston movable axially in a cylinder under the influence of fluid pressure, and a control valve having rotary and reciprocatory ported members arranged to permit pressure fluid to be effective at either side of the piston at choice to move said piston through an axial distance related to the arcuate movement imparted to the rotary member.

The rotary and reciprocatory members of the control valve may be arranged coaxially with and around a piston stem extending on one side of the piston and formed with three passages communicating on the one hand respectively with opposite sides of the piston and with an exhaust outlet, and on the other hand with the control valve.

The reciprocatory member may have three ports arranged to register with the three passages, and the rotary member may have two ports capable of being placed in register with either the first and second, or the second and third, of said three ports, by arcuate movement of said rotary member.

These two ports of the reciprocatory member which have been placed in register with the ports of the rotary member by arcuate movement thereof may be arranged to be closed to said ports by axial movement of the reciprocatory member.

Each port in the rotary and reciprocatory members may be formed as a parallelogram having two opposite sides lying in parallel planes normal to the axis of the piston.

The angle between two adjacent sides of the parallelogram may be selected to provide a predetermined correlation between a given arcuate movement of the rotary member and the resultant axial movement of the piston.

A compression spring may be provided within the cylinder on the side of the piston remote from the control valve to resist the movement of the piston in either direction.

2

One embodiment of the invention will be described with reference to the accompanying drawings, in which:

Figure 1 is a longitudinal sectional elevation of a servo-motor and a control valve, Figure 2 is a cross-section of the control valve on the line II—II, Figure 1, showing the valve in the neutral position.

Figure 3 is a diagrammatic representation showing developments of a piston taper sleeve and rotary valve sleeve, and the positions of the ports therein, when the valve is in the neutral position, the line A—A Figure 3, corresponding with the line II—II, Figure 1, Figure 4 is a diagrammatic development of the taper end of a piston stem, showing grooves therein, Figure 5 is a diagrammatic end elevation of the piston stem, Figure 6 is a longitudinal sectional elevation corresponding with Figure 1, but showing the servo-motor with the valve moved 45° clockwise, Figure 7 is a cross-section of the control valve on the line VII—VII, Figure 6, Figure 8 is a diagrammatic representation corresponding with Figure 3, showing the positions of the ports when the valve is in the position shown in Figures 6 and 7, the line B—B, Figure 8, corresponding with the line VII—VII, Figure 6, Figure 9 is a longitudinal sectional elevation corresponding with Figure 1, but showing the servo-motor with the valve moved 45° anti-clockwise, Figure 10 is a cross-section of the control valve on the line X—X, Figure 9, Figure 11 is a diagrammatic representation corresponding with Figure 3, showing the positions of the ports when the valve is in the position shown in Figures 9 and 10, the line C—C, Figure 11, corresponding with the line X—X, Figure 9, and Figure 12 is a diagrammatic elevation showing the servo-motor and valve employed in the pump equipment of an embossing press.

Referring to the drawings, the embodiment of the invention which will be described hereinafter is intended for use with a reversible variable delivery pump 19, to a member 20 of which it is desired to impart a predetermined linear movement by the servo-motor, to which in turn rotary movement correlated with the linear movement has been imparted by an electric torque motor 18.

The servo-motor body consists of a horizontally disposed cylinder 21, within which is a piston 22 slidable axially relatively to the cylinder 21 and having piston stems 23, 24 extending axially on both sides thereof. The stem 23, termed the left-hand stem, is embraced by a sleeve 25 mounted fast thereon and provided with packings 26 and projects through a bush 27 at the left-hand end of the cylinder 21, and is connected with the cross-head 20 of the variable delivery pump. Within the bore of the cylinder 21 and around the left-hand stem 23 is a compression spring 28 abutting at its left-hand end against a flange 29 which is integral with a distance piece 30 and slidable relatively to the piston stem 23, and said spring 28 abutting at its right-hand end against a flange 31 also slidable on the stem 23 and formed with passages 32. The axial movement of the flange 31 is restricted by the distance piece 30 and a sleeve 33 on the other side thereof located around the left-hand piston stem 23 and forming part of a spring cage 34 enveloping the spring 28, and which consists of a cylindrical body secured within and to the cylinder 21 of the servo-motor, the right-hand end of said spring cage having an inwardly extending flange 35 and the sleeve 33 rigid therewith. The flange 35 is apertured at 36 to permit the passage of pressure fluid therethrough. The cylinder 21 is formed with a bleed hole 37 and is provided with an air cock (not shown) to permit the release of any air which may have accumulated therein.

The other piston stem 24, termed the right-hand piston stem, extends through a sleeve 38 adjacent to the right-hand end wall 39 of the servo-motor cylinder 21, through packings 40, and has a coaxial extension 41 integral therewith outside the cylinder. The body of the cylinder 21 has an inlet 42 for constant pressure hydraulic fluid, communicating with the interior of the cylinder just to the right of the piston 22. The sleeve 38 through which the right-hand piston stem 24 passes is formed with an internal exhaust gallery 43 communicating with a passage 44, external gallery 45, and an exhaust passage 46 in the body of the cylinder 21. The right-hand piston stem 24 and its extension 41 are formed with three axial passages 47, 48, 49 located, at the same radius from the axis of the stem, in radial planes disposed each at 60° from its neighbour, when viewed in the axial direction, as in Figures 2 and 5. These axial passages are blind-ended at various points in the interior of the piston, and are plugged at their other ends, i. e., at the free end of the right-hand piston stem extension, as indicated at 47a, 48a, 49a. It is to be noted that in Figures 1, 6, and 9 these passages are indicated diagrammatically in broken lines, their actual dispositions being altered for clarity; their true dispositions are shown in Figures 2, 7, and 10. They will be termed respectively the first, second, and third passages.

All three passages 47, 48, 49 have communicating therein three short radial passages 50, 51, 52 lying in a transverse plane approximately half-way along the length of the piston stem extension 41. This extension is tapered, the free end being the smaller end. The first, second, and third passages 47, 48, 49 are thereby put in communication with the exterior tapered surface of the extension. The mouth of the radial passage 50 connected with the first passage 47 communicates with a U-shaped groove 53 (see Figure 4) formed in the tapered surface of the extension, the limbs of the U being disposed axially, and the breadth of the U being such that it extends over an arc of 180°. The first passage 47 is thereby put in communication with a part 54 of the tapered surface diametrically opposite that point at which its own radial passage 50 emerges.

The third passage 49 is similarly provided with a U-shaped groove 55, the limbs of which are arranged so as to be interdigitated with the limbs of the U-shaped groove 53 of the first passage 47 so that the two grooves 53, 55 are not put into communication; the third passage 49 is therefore also put into communication with the part 56 of the tapered surface diametrically opposite that point at which its own radial passage 52 emerges.

The second passage 48 is correspondingly put in communication with the corresponding diametrically opposite point by having a diametrically disposed extension 51a of its radial passage 51.

The first passage 47, at its other end, is formed with a short radial passage 57 by which it is put into communication with the outer surface of the right-hand piston stem 24, about midway along the length thereof.

The second passage 48 has intersecting it an inclined passage 58 which passes through the piston 22 and emerges on the other side thereof, so putting the second passage 48 in communication with that part of the cylinder in which the compression spring 28 is contained.

The third passage 49 has a short radial duct 59 emerging from the right-hand piston stem 24 close to the piston 22. The diameter of this duct is chosen according to the speed required of the piston 22.

The tapered extension 41 has located around and secured to it an internally tapered sleeve 60, termed the reciprocatory sleeve, having an externally parallel surface pierced by six identical ports 61 equally spaced around a crcumferential line lying in the transverse plane which passes through the three radial passages, i. e., the plane of Figures 2, 7, and 10. These six ports 61 register with the ends of the three passages, 50, 51, 52 and the diametrically opposite points 54, 51a, 56 with which they are in communication, as described above. Each port 61 is formed in the shape of a rhombus, two opposite sides of which are parallel with the aforesaid transverse plane. The rhombi are substantially equal in length to the interstices between them.

Embracing the reciprocatory sleeve 60 is a cylindrical sleeve 62, termed the rotary valve sleeve, and arranged to be rotatable with, and contained by seals 63 within, a rotary valve body 64. The rotary valve sleeve 62 is formed with four ports, arranged in two pairs, 65, 65, 66, 66, each port being in the shape of a parallelogram the circumferential dimension and spacing (relatively to the other port of the pair) and the angular disposition of the sides of which are identical with the corresponding dimensions of the ports 61 of the reciprocatory sleeve 60.

The rotary valve body 64 is formed with two internal circumferential galleries 67, termed connecting galleries, each extending over an arc of 90°, and serving to connect together the two ports 65, 65, or 66, 66 of each pair of ports in the rotary valve sleeve 62.

The rotary valve body 64 is provided with a coupling adapter 68 at the end thereof remote from the servo-motor, and the motor 18 is provided to impart the necessary rotary motion to this adapter 68.

To ascertain the operation of the valve, it is first necessary to establish the relative location of the parts when the valve is in the neutral position, as shown in Figures 1 to 3.

In this position the ports 65, 65, 66, 66 in the rotary valve sleeve 62 are in register with the interstices between the ports 61 of the reciprocatory sleeve 60, and the mid-points of all the ports lie in the same transverse plane (see Figure 3). The control valve is therefore closed. Thus, pressure fluid from the inlet 42 in the servo-motor body 21 is unable to enter the body, and the fluid already in the body, at the left-hand side of the piston 22, is unable to escape, and the piston remains stationary.

Let it now be assumed that the coupling adapter 68 is turned 45° clockwise, as viewed from the right-hand end of the servo-motor, bringing the parts to the positions shown in Figures 6 to 8. The two ports of each pair of ports 65, 65, 66, 66, of the rotary valve sleeve 62 now register partly with, say, the first and second of each group of three ports 61 of the reciprocatory sleeve 60. Under constant pressure from the pressure fluid inlet, the piston 22 is urged towards the left. This forces the fluid on the left of the piston through the passages 58, 48, 51, and 51ª, through the appropriate port 61, in the reciprocatory sleeve 60 and the ports 65, 66 in the valve sleeve 62, through the connecting galleries 67 in the rotary valve body 64, back through appropriate ports 65, 66 in the rotary valve sleeve 62 and ports 61 in the reciprocatory sleeve 60 into the passages 50 and 47, and thence to the exhaust passage 57, gallery 43 and exhaust passages 44, 45, 46. This permits the movement of the piston 22 towards the left, against the spring 28, the resistance of which slowly builds up. This movement causes the cross-head 20 to be moved to the left, and the pump or component associated with the servo-motor to be operated. At the same time, the movement of the piston 22 moves the reciprocatory sleeve 60 to the left (downwards in Figure 8), cutting off those ports 61 which were open after an axial movement corresponding with the 45° rotary movement imparted to the rotary valve body 64, and restoring the relative locations of the reciprocatory and rotary valve sleeves 60, 62 to the neutral position.

Referring now to Figures 1 and 9 to 11, let it be assumed that the rotary valve body 64 is turned anti-clockwise through 45°. The two ports of each pair of ports 65, 65, 66, 66 of the rotary valve sleeve 62 will now register partly with the second and third of each group of three ports 61 of the reciprocatory sleeve 60. This will put the passages 51, 48 and 52, 49 in communication with one another, permitting pressure fluid to flow from the inlet 42 into the chamber 42ª at the right-hand side of the piston 22, then by way of the passage 59, third passage 49, and passage 52 and also from the passage 52, via the groove 55, to the point 56, through the appropriate ports 61, 65, 66 in the reciprocatory and rotary valve sleeves 60 and 62, through the connecting galleries 67, back through the appropriate ports 65, 66, 61 in the rotary valve and reciprocatory sleeves 62, 60 into the passage 51, second passage 48, and thence via the passage 58 to the chamber 21ª at the left-hand side of the piston 22. Pressure is now equal on both sides of the piston 22, but the effective area of the left-hand side of the piston is greater than that of the right-hand side, owing to the diameter of the right-hand piston stem 24 being greater than that of the left-hand piston stem 23, and the piston 22 is therefore moved towards the right, to control the cross-head 20 of the pump 19 with which it is associated. At the commencement of this movement the opening tendency of the spring 28 is constrained by the impact of the outwardly directed flange 31 on the piston stem 23 against the inwardly directed flange 35 of the spring cage 34, so that this movement of the piston 22 towards the right is only assisted by the spring 28 so long as the reciprocatory sleeve 60 is left of the neutral position, relatively to the rotary valve sleeve 62. Simultaneously with this movement of the piston 22 the reciprocatory sleeve 60 is moved to the right (upwards in Figure 11), closing the ports 61, 65, 66 of the rotary valve and thus arresting the piston 22 after an axial movement proportional to the angular movement imparted to the rotary valve sleeve 62.

The performance of the servo-motor and control valve may be modified as required. Thus, the speed of axial movement of the piston 22 may be governed by suitable selection of the diameter of the radial passage 59 connecting the third passage 49 with the chamber 42ª at the right-hand side of the piston. The relation between the movements of the reciprocatory sleeve 60 and the rotary valve sleeve 62 (and hence the axial movement of the piston 22 relatively to a given arcuate movement of the control valve) may be arranged by suitable selection of the internal angles and dimensions of the parallelogram-shaped ports.

It is also to be understood that although the invention has been described as applied to the pumping equipment of an embossing press, its application is not limited thereto.

We claim:

1. A hydraulic servo-motor comprising a source of fluid pressure, a body formed as a cylinder, a piston movable axially in said cylinder under the influence of the fluid pressure, a control valve, a rotary ported member and a reciprocatory ported member disposed coaxially within said control valve, an exhaust outlet formed in the wall of the cylinder, a piston stem extending on one side of the piston coaxial with and within said ported members and formed with three passages communicating on the one hand respectively with opposite sides of the piston and with the exhaust outlet, and on the other hand with the control valve, the ported members permitting pressure fluid to be effective at opposite sides of the piston selectively and move said piston axially, and means serving to rotate the rotary ported member through a predetermined arc, the axial movement of the piston being related to the arcuate movement imparted to the rotary ported member.

2. A hydraulic servo-motor as claimed in claim 1, wherein the reciprocatory member has three ports arranged to register with the three passages, and the rotary member has two ports capable of being placed in register with any one of two groups of ports, the first group comprising the first and second ports, and the second group comprising the second and third ports, of said three ports, by arcuate movement of said rotary member.

3. A hydraulic servo-motor comprising a source of fluid pressure, a body formed as a cylinder, a piston movable axially in said cylinder under the influence of the fluid pressure, a control valve, a rotary ported member and a reciprocatory ported member disposed coaxially within said control valve, an exhaust outlet formed in the wall of the cylinder, a piston stem extending on one side of the piston coaxial with and within said ported members and formed with three passages communicating on the one hand respectively with opposite sides of the piston and with the exhaust outlet, and on the other hand with the control valve, the ported members permitting pressure fluid to be effective at opposite sides of the piston selectively and move said piston axially, and means serving to rotate the rotary ported member through a predetermined arc, the axial movement of the piston being related to the arcuate movement imparted to the rotary ported member, the reciprocatory member having three ports arranged to register with the three passages, and the rotary member having two ports capable of being placed in register with any one of two groups of ports, the first group comprising the first and second ports, and the second group comprising the second and third ports, of said three ports, by arcuate movement of said rotary member, wherein those two ports of the reciprocatory member which have been placed in register with the ports of the rotary member by arcuate movement thereof are arranged to be closed to said last-mentioned ports by axial movement of the reciprocatory member.

4. A hydraulic servo-motor as claimed in claim 3, wherein each port is formed as a parallelogram having two opposite sides lying in parallel planes normal to the axis of the piston.

5. A hydraulic servo-motor comprising a source of fluid pressure, a body formed as a cylinder, a piston movable axialy in said cylinder under the influence of the fluid pressure a control valve, a rotary ported member and a reciprocatory ported member disposed coaxially within said control valve, an exhaust outlet formed in the wall of the cylinder, a piston stem extending on one side of the piston coaxial with and within said ported members and formed with three passages communicating on the one hand respectively with opposite sides of the piston and with the exhaust outlet, and on the other hand with the control valve, the ported members permitting pressure fluid to be effective at opposite sides of the piston selectively and move said piston axially, and means serving to rotate the rotary ported member through a predetermined arc, the axial movement of the piston being related to the arcuate movement imparted to the rotary ported member, the reciprocatory member having three ports arranged to register with the three passages, and the rotary member having two ports capable of being placed in register with any one of two groups of ports, the first group comprising the first and second ports, and the second group comprising the second and third ports, of said three ports, by arcuate movement of said rotary member, those two ports of the reciprocatory member which have been placed in register with the ports of the rotary member by arcuate movement thereof being arranged to be closed to said last-mentioned ports by axial movement of the reciprocatory member, each port being formed as a parallelogram having two opposite sides lying in parallel planes normal to the axis of the piston, wherein the angle between two adjacent sides of the parallelogram provides a predetermined correlation between a given arcuate movement of the rotary member and the resultant axial movement of the piston.

ALEC FRANK MARSHALL.
HARRY ANDREW REES.

REFERENCES CITED

The following references are of record in the file of this patent:

UNITED STATES PATENTS

| Number | Name | Date |
| --- | --- | --- |
| 2,244,296 | Heinrich | June 3, 1941 |

FOREIGN PATENTS

| Number | Country | Date |
| --- | --- | --- |
| 464,891 | Great Britain | Apr. 27, 1937 |

---

Certificate of Correction

Patent No. 2,544,035

March 6, 1951

ALEC FRANK MARSHALL ET AL.

It is hereby certified that the name of the co-inventor was erroneously described and specified as "Harry Andrew Rees" whereas said name should have been described and specified as *Henry Andrew Rees*;

and that the said Letters Patent should be read as corrected above, so that the same may conform to the record of the case in the Patent Office.

Signed and sealed this 26th day of June, A. D. 1951.

[SEAL]

THOMAS F. MURPHY,
*Assistant Commissioner of Patents.*